United States Patent [19]
Taylor

[11] Patent Number: 4,720,809
[45] Date of Patent: Jan. 19, 1988

[54] HYBRID FLOATING POINT/LOGARITHMIC NUMBER SYSTEM ARITHMETIC PROCESSOR

[75] Inventor: Fred J. Taylor, Gainesville, Fla.

[73] Assignee: University of Florida, Gainesville, Fla.

[21] Appl. No.: 652,628

[22] Filed: Sep. 21, 1984

[51] Int. Cl.$^4$ .......................... G06F 7/38; G06F 5/00
[52] U.S. Cl. ........................... 364/748; 364/715; 235/310
[58] Field of Search ............... 364/748, 736, 715, 745, 364/749, 750, 768; 235/310

[56] References Cited

U.S. PATENT DOCUMENTS

| | | | |
|---|---|---|---|
| 3,436,533 | 4/1969 | Moore et al. | 364/715 |
| 3,631,230 | 12/1971 | Chen | 364/715 |
| 3,725,649 | 4/1973 | Deerfield | 364/748 |
| 3,787,673 | 1/1974 | Watson et al. | 364/736 |
| 4,054,787 | 10/1977 | Pos | 364/748 |
| 4,078,250 | 3/1978 | Windsor et al. | 364/715 |
| 4,308,589 | 12/1981 | Joyce et al. | 364/748 |
| 4,583,180 | 4/1986 | Kmetz | 364/748 |

OTHER PUBLICATIONS

E. L. Hall, D. D. Lynch, and S. J. Dwyer, III, "Generation of Products and Quotients Using Approximate Binary Logarithms for Digital Filtering Applications", *IEEE Transactions on Computers*, vol. C-19 pp. 97-105, Feb. 1970.

T. C. Chen, "Automatic Computation of Exponentials, Logarithms, Ratios and Square Roots", *IBM J. Res. Development*, vol. 16, pp. 380-388, Jul. 1972.

D. Marino, "New Algorithms for the Approximate Evaluation in Hardware of Binary Logarithms and Elementary Functions", *IEEE Transactions on Computers*, (Short Notes), vol. C-21, pp. 1416-1421, Dec. 1972.

J. C. Majithia and D. Levan, "A Note on Base-2 Logarithm Computations", Proc. IEEE (Lett.), vol. 61, pp. 1519-1520, Oct. 1973.

T. A. Brubaker et al., "Multiplication Using Logarithms Implemented with Read-Only Memory", *IEEE Trans. on Computers*, vol. C-24, No. 8, Aug. 1975, pp. 761-765.

D. J. Kuck et al., "Analysis of Rounding Methods in Floating-Point Arithmetic", *IEEE Trans. on Computers*, vol. C-26, No. 7, Jul. 1977, pp. 643-650.

J. N. Mitchell, "Computer Multiplication and Division Using Binary Logarithms", *IRE Trans. on Electronic Computers*, Aug. 1962, pp. 512-517.

F. J. Taylor, "An Extended Precision Logarithmic Number System", *IEEE Transactions on Acoustics, Speech, and Signal Processing*, vol. ASSP 31 No. 1, Feb. 1983, pp. 232-234.

E. E. Swartzlander, Jr. and A. G. Alexopoulos, "The Sign/Logarithm Number System", *IEEE Transactions on Computers*, vol. C-24, Dec. 1975, pp. 1238-1242.

S. C. Lee and A. D. Edgar, "The Focus Number System", *IEEE Transactions on Computers*, vol. C-26, No. 11, Nov. 1977, pp. 1167-1170.

E. E. Swartzlander, Jr., "Comment on 'The Focus Number System'", *IEEE Transactions on Computers*, vol. C-28, No. 9, Sep. 1979, p. 693.

S. C. Lee and A. D. Edgar, "Addendum to 'The Focus Number System'", *IEEE Transactions on Computers*, vol. C-28, Sep. 1979, p. 693.

*Primary Examiner*—David H. Malzahn
*Assistant Examiner*—Long Thanh Nguyen
*Attorney, Agent, or Firm*—Dennis P. Clarke

[57] ABSTRACT

A hybrid arithmetic processor which combines attributes of conventional floating point (F.P) arithmetic with logarithmic number system (LNS) arithmetic. The arithmetic processor includes an input section (forward code converter) for converting input operands in F.P. format to intermediate operands in LNS format, an LNS arithmetic section for performing an arithmetic operation on the LNS intermediate operands and providing an intermediate output in LNS format, and an output section (inverse code converter) for converting the LNS intermediate output to an output in F.P. format. Significantly, output is provided in normalized floating point format but without the need for a time-consuming exponent alignment operation. Arithmetic operations, including addition and multiplication, are accomplished at a high speed, which speed moreover is constant and independent of the data. An efficient accumulator structure and the structure of an ultra-fast numeric processor are disclosed.

8 Claims, 8 Drawing Figures

HYBRID FLOATING POINT/LOGARITHMIC NUMBER SYSTEM ARITHMETIC PROCESSOR

BACKGROUND OF THE INVENTION

The present invention relates to floating-point arithmetic processing units such as are employed in digital computers, as well as in various specialized processors which require high speed arithmetic operations.

In digital computers and the like, where a large dynamic range and high precision are required, numbers are usually expressed in floating point (F.P.) representation. Numbers expressed in floating point include a mantissa and an exponent, and normally a sign. Thus, in a floating point environment, a real number X can be approximated by $$X = m_x r^e \tag{1}$$

where r is the radix, m is the signed (M+1) bit mantissa, and e is the signed (E+1) bit exponent. Digital computers normally operate on binary numbers, so the radix r=2. With a real number X expressed as above, the precision is on the order of $2^{-M}$, and the largest number is $r^p$, where $p=2^E$.

As noted above, floating point representation allows a large dynamic range and high precision, and thus is well suited to scientific calculations. There are of course a great many other applications, for example the processing of complex signal waveforms such as by Fourier analysis. There are, however, disadvantages. A particular disadvantage is that floating point arithmetic operations are relatively slow compared to their fixed point counterpoints. Moreover, floating point addition can cause a special problem, especially in real-time control applications where complex signal waveforms must be processed.

In particular, the time it takes to perform a floating point addition or subtraction can vary markedly depending upon the relative values of the data to be added or subtracted. Addition and subtraction conventionally require that the exponents be matched prior to the arithmetic process. Not only is this time consuming, but the time required for this matching process is, as noted just above, data dependent.

In addition, all four arithmetic operations require that the result be normalized by shifting the resultant mantissa until the radix point is properly positioned, and correspondingly adjusting the exponent. This, too, consumes time, which time is data dependent.

More specifically, floating point arithmetic is performed in stages. Multiplication (or division) is a three-step process which proceeds generally as follows:

(1) Multiply (or divide) the mantissas, and add (or subtract) the exponents.

(2) Post normalize the resultant mantissa, and then round.

(3) If required, adjust the exponent depending upon the normalization.

Floating point addition and subtraction are even more complex. Addition (or subtraction) is a four-step process generally as follows:

(1) Align the exponents, and shift mantissas accordingly.

(2) Add (or subtract) the mantissas.

(3) Post normalize the resultant mantissa, and round the result.

(4) If required, adjust the exponent depending upon the normalization required.

In present commercial floating point adder/subtractor units, up to one third of an arithmetic cycle can be consumed in an exponent alignment process. In addition, the length of time required to complete an exponent alignment is data dependent and, therefore, variable. In one particular machine (a Digital Equipment Corp. LSI-11), exponent alignment can take up to 17 microseconds, with a basic mantissa add time of 42 microseconds.

Thus, the development of efficient algorithms for processing floating point numbers is an area of continued interest.

Another disadvantage with floating point arithmetic operations is that the data flow paths through the arithmetic unit for multiplication/division and addition/subtraction are sufficiently different so as to demand (in most commercial realizations) two separate hardware units. As a result, the utilization rate of a hardware floating point unit can be as low as 50%.

As an alternative to floating point representation and arithmetic, the logarithmic number system (LNS) has been proposed and implemented to some extent. For example, the logarithmic number system and techniques for performing LNS arithmetic are described in E.E. Swartzlander, Jr. and A.G. Alexopoulos, "The Sign-/Logarithm Number System", *IEEE Transactions On Computers*, Vol. C-24, December 1975, pages 1238-1242; and S. C. Lee and A. D. Edgar, "The Focus Number System", *IEEE Transactions On Computers*, Volume C-26, No. 11, November 1977, pages 1167-1170. Related to the above two articles are E. E. Swartzlander, Jr., "Comment On 'The Focus Number System'", *IEEE Transactions On Computers*, Volume C-28, No. 9, September 1979, page 693; and S. C. Lee and A. D. Edgar, "Addendum to 'The Focus Number Systems'", *IEEE Transactions On Computers*, Volume C-28, No. 9, September 1979, page 693.

In LNS, the mantissa is assigned a value of unity, and the exponent is given a fractional binary representation. For a given real X, the LNS representation is given by $$X = +r^e \tag{2}$$

where e is a signed fractional number and r is, again, the radix. In a system having a known and unvarying radix r (e.g. where r=2), the exponent e alone completely represents the number X. In the nomenclature employed herein, for an input operand X the exponent representing the operand in LNS format is $e'_x$; for an input operand Y the exponent representing the operand in LNS format is $e'_y$; and the result S of an LNS arithmetic operation is represented in LNS format as $e'_s$.

A significant advantage of the logarithmic number system is that arithmetic operations can be implemented so as to be very fast and, moreover, require a constant time regardless of the data.

Various techniques for performing arithmetic operations in LNS format are described in detail in the above-referenced literature references. However, for a better understanding of the present disclosure, LNS multiplication and addition are briefly summarized below.

LNS multiplication is nearly trivial, and requires only the addition of the exponents representing the two numbers to be multiplied. Thus, where the number X is represented in LNS format by the exponent $e'_x$, and the number Y is represented in LNS format by the exponent $e'_y$, the exponent $e'_s$ in LNS format representing the product of X and Y is the following:

$$e'_s = e'_x + e'_y, \text{ for multiplication.} \quad (3)$$

As derived in the literature references identified above, addition (as well as subtraction) can be performed based on an extension of multiplication.

In particular, the LNS representation $e'_s$ of the product of two numbers X and Y represented in LNS format by the exponents $e'_x$ and $e'_y$ is as follows:

$$e'_s = e'_x + \theta(e'_x - e'_y), \text{ for addition} \quad (4)$$

where the order of operands is arranged such that $e'_x \leq e'_y$, and the function $\theta$ is given by:

$$\theta(e'_x - e'_y) = \log_r(1 + r^{(e'_y - e'_x)}). \quad (5)$$

By letting $$v = e'_x - e'_y, \ v \leq 0 \quad (6)$$

the above equation (5) can be simplified to:

$$\theta(v) = \log_r(1 + r^{-v}) \quad (7)$$

From the above Equations (4)–(7) it might at first appear that addition (and also subtraction) of numbers in LNS representation would be rather difficult, involving the calculation of base 2 (i.e. binary) logarithms and exponential functions. However, as is pointed out in the literature, in binary digital computer and specialized processor implementations, the function $\theta$ can be implemented quite simply by employing a look-up table in read-only memory (ROM). While calculation time is of course required to generate the look-up table in the first place, once it has been generated, the time during operation to determine the function value is simply the memory access time, typically expressed in nanoseconds. Thus, if the value v in Equation (7) is represented as an eight-bit number, then the look-up table need have only $2^8 = 256$ entries. As another example, if the value v is expressed with twelve-bit precision, then a look-up table with $2^{12} = 4096$ entries is required.

Although LNS arithmetic is advantageous in terms of speed, which, significantly, is constant regardless of the data operated on, a significant disadvantage of LNS arithmetic is that the resolution or precision varies substantially throughout the range of absolute magnitudes. In short, the precision is a logarithmic function of the magnitude. Thus, the above-referenced E. E. Swartzlander, Jr. and A. G. Alexopoulos article entitled "The Sign/Logarithm Number System" emphasizes that "this system can not replace conventional arithmetic units in general purpose computers; rather it is intended to enhance the implementation of special purpose processors for specialized applications (e.g., pattern recognition, digital image enhancement, radar processing, speech filtering, etc.)." Similarly, the abovereferenced S. C. Lee and A. D. Edgar article entitled "The Focus Number System" emphasizes that available resolution is "focused" near zero. The LNS is described by Lee and Edgar as being particularly useful in digital control systems which should respond qualitatively strongly to gross errors between the output and the control signal, and quantitatively delicately as equilibrium is approached.

More recently, and directed also to the difficulty of maintaining a sufficiently high degree of precision over a wide dynamic range with LNS arithmetic, the present inventor has described a linear interpolation technique for extending the precision of an LNS arithmetic unit. See F. J. Taylor, "An Extended Precision Logarithmic Number System", *IEEE Transactions On Acoustics, Speech, and Signal Processing*, Vol. ASSP-31 Number 1, February 1983, pages 232-234.

SUMMARY OF THE INVENTION

The present invention provides a hybrid arithmetic unit for digital computers which combines attributes of a conventional floating point processor with the logarithmic number system. Although a hybrid, the unit may be viewed as a floating-point arithmetic unit in that the input and output are in conventional floating point format. Significantly, however, no time-consuming exponent alignment is required, particularly during addition. High speed addition and multiplication are provided, and an efficient accumulator (repeated addition) structure can be realized. Data flow is highly regular regardless of the actual data. Moreover, there is a high degree of commonality in the addition and multiplication data flow paths, resulting in efficient use of the hardware. The arithmetic unit can readily be implemented in a relatively few number of Very Large Scale Integration (VLSI) circuit integrated "chips".

In short, the arithmetic unit of the invention maintains the precision and dynamic range of floating point arithmetic, and eliminates the disadvantages of high overhead and reduced throughout due, in particular, to normalization and exponent alignment requirements of conventional floating point arithmetic.

The arithmetic unit of the invention includes an LNS arithmetic section for performing arithmetic operations. These arithmetic operations include addition, subtraction, multiplication and division, as have been previously reported. In addition, in accordance with one aspect of the invention, an efficient LNS accumulator structure can be provided.

An important aspect of the invention is an efficient Floating Point (F.P.) to LNS converter, also referred to herein as a "forward code converter". Input operands are converted from F.P. to LNS format, and applied to the LNS arithmetic section.

Correspondingly, another important aspect of the invention is an LNS to F.P. converter, also referred to herein as an "inverse code converter", which converts numbers in LNS format output by the LNS arithmetic section back to floating point format. It is significant that the inverse code converter provides a floating point number which is already normalized.

Thus, in accordance with the invention, a processor for performing an arithmetic operation on a pair of input operands in floating point format to provide an output also in floating point format includes an input section (forward code converter) for converting the F.P. input operands to intermediate operands in LNS format, an LNS arithmetic section for performing an arithmetic operation on the LNS intermediate operands and providing an intermediate output in LNS format, and an output section (inverse code converter) for converting the LNS intermediate output to the output in F.P. format.

The F.P. to LNS converter (forward code converter) of the invention operates on the mantissa $m_x$ and exponent $e_x$ of floating point operands X and Y represented in floating point format as follows:

$$X = m_x r^{e_x} \quad (8)$$

$$Y = m_y r^{e_y} \quad (9)$$

to provide exponents $e'_x$ and $e'_y$ representative of X and Y in LNS format. More particularly, in LNS format, X and Y are as follows:

$$X = r^{e'_x} \quad (10)$$

$$Y = r^{e'_y} \quad (11)$$

The actual conversion operation performed by the input mapping device (forward code converter) for input operand X, given the mantissa $m_x$ of the number in floating point format, is defined by:

$$e'_x = e_x + \phi(m_x) \quad (12)$$

where the function $\phi$ is defined as:

$$\phi(m) = \Delta = \log_r(m) \quad (13)$$

Similarly, given the mantissa $m_y$ and the exponent $e_y$ of the number in floating point format, the F.P. to LNS conversion for input operand Y is defined by:

$$e'_y = e_y + \phi(m_y) \quad (14)$$

From the above Equations (12)–(14), it will be appreciated that the necessary conversion is accomplished in each case by the combination of a logarithmic mapping device for determining the function $\phi(m)$, with an adder for adding the value of $\phi(m_x)$ or $\phi(m_y)$ to the floating point exponent $e_x$ or $e_y$. As in the case of the functions required to implement LNS addition and subtraction described in the literature cited hereinabove, the mapping required to determine $\phi(m)$ function for the F.P. to LNS conversion element of the invention is readily implemented by means of a look-up table in ROM.

This F.P. to LNS conversion of the invention shares with previously-reported LNS arithmetic the significant characteristics of high speed which is data-independent.

The output section (inverse code converter) of the invention converts the LNS representation $e'_s$ of the LNS arithmetic result to the mantissa $m_s$ and exponent $e_s$ of the output in floating point format.

In particular, the floating point exponent $e_s$ is determined from the LNS representation by a simple truncation operation. Thus, $$e_s = \lceil e'_s \rceil \quad (15)$$

the symbols "$\lceil$" and "$\rceil$" of Equation (15) above are the notation for a ceiling function implemented by rounding up to the next highest integer value.

The floating point mantissa $m_s$ is determined as follows by the inverse code converter:

$$m_s = \phi^{-1}(\Delta_s) \quad (16)$$

where:

$$\Delta_s = e'_s - \lceil e'_s \rceil \quad (17)$$

and $$\phi^{-1}(\Delta_s) = r^{\Delta_s} \quad (18)$$

It will be appreciated that the function $\phi^{-1}(\Delta_s)$ is also implemented by means of a look-up table in ROM as in the case of the other loqarithmic and exponential functions described herein.

From the mathmatical definition of Equations (15)–(18) above, particularly Equation (17), it can be inferred that output code conversion requires a subtraction operation. However, in practical embodiments the need for an actual subtractor can be eliminated by simply taking the fractional part of $e'_s$ and providing an accordingly-modified look-up table.

It is significant that the result of the LNS to F.P. conversion described above through Equations (15)–(18) inherently provides a floating point output with the mantissa $m_s$ is already normalized. Moreover, this LNS to F.P. conversion is a high speed operation, with the speed independent of the data.

In view of the foregoing, it will be appreciated there are a number of advantageous characteristics of the invention. One advantageous characteristic is the F.P. mantissa acts as a scale factor for better precision. In other words, the resolution compared to LNS is much more uniform, and the strong characteristics of LNS are much better utilized. Input and output to the unit are in conventional F.P. format (although not necessarily conforming to an ANSII standard, depending upon the number of bits employed); and the returned mantissa is auto-scaled. The execution speed is fast, and, moreover, constant. Accumulator operation is readily achieved. Therefore many operations, such as polynomial calculations, are more efficient.

It is anticipated that the arithmetic unit of the invention will be especially useful in arithmetic-intensive tasks including, but not limited to: satellite communications, picture and scene analysis, radar and sonar systems, pattern recognition, emitter identification, computer vision, speech recognition, speaker identification, computer graphics, CCC systems, attached array processors, two- and three-dimensional Fast Fourier Transforms, systems of PDE's and guidance and navigation.

BRIEF DESCRIPTION OF THE DRAWINGS

While the novel features of the invention are set forth with particularity in the appended claims, the invention, both as to organization and content, will be better understood and appreciated along with other objects and features thereof, from the following detailed description taken in conjunction with the drawings, in which:

DETAILED DESCRIPTION

Figure 1:
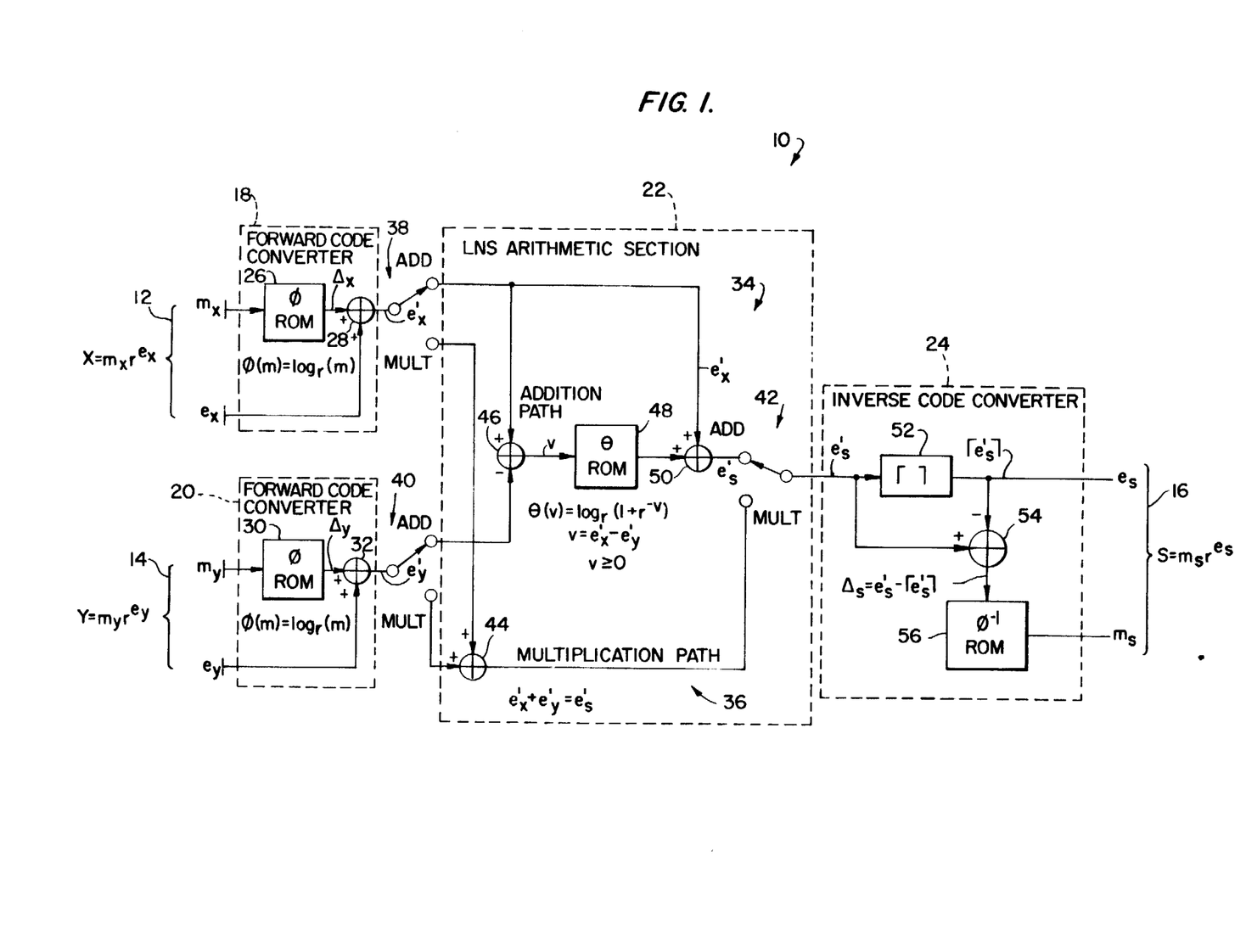
FIG. 1 is a schematic diagram of an arithmetic processor in accordance with the invention.

Referring first to FIG. 1, an arithmetic processor generally designated 10 operates on a pair of input operands 12 and 14 in floating point format to provide an output 16 also in floating point format. As shown, the input operand 12 is expressed in therm given by Equation (8) hereinabove and comprises a mantis $m_x$ and an exponent $e_x$, while the operand 14 is expressed in the form of Equation (9) hereinabove and has a mantissa $m_y$ and an exponent $e_y$. The floating point output operand 16 comprises an mantissa $m_s$ and an exponent $e_s$ together representing the floating point number $S = m_s r^{e_s}$. It will be appreciated that each of the exponents and mantissas referred to herein is conventionally represented by a plurality of binary bits.

In the specific examples disclosed herein, the radix $r = 2$.

In overview, the processor 10 includes an input section comprising respective forward code converters 18 and 20 for converting the respective mantissas and exponents of the floating point input operands X and Y to intermediate operands $e'_x$ and $e'_y$ in logarithmic number system (LNS) format, an LNS arithmetic section 22 for performing an arithmetic operation on the LNS intermediate operands $e'_x$ and $e'_y$ and providing an intermediate output $e'_s$ in LNS format, and an output section comprising an inverse code converter 24 for converting the LNS intermediate output $e'_s$ to the output S in floating point format.

It will be appreciated that conventional timing (clock) circuitry is required to coordinate the data flow through the various elements, inasmuch as the various adders and ROMs are subject to propagation delay and memory access time limitations. However, for clarity of illustration, the timing circuitry is not shown.

Referring in detail to exemplary forward code converter 18, the forward code converter 18 includes an input mapping device 26 for converting the mantissa $m_x$ to an exponent $\Delta_x$. As defined by Equation (13) hereinabove, the input mapping device 26 simply determines the base r logarithm of the input mantissa $m_x$. For the binary number system as conventional in digital computers, the input mapping device 26 determines a base two logarithm.

Preferably the mapping device 26 comprises a lookup table in the form of a read-only memory (ROM) with a number of address lines equal to the width in bits of the input mantissa $m_x$, and a word length equal to the length in bits of the output exponent $\Delta_x$. Typically, these are eight-to twelve-bits wide.

The forward code converter 18 also includes an adder 28 for summing the exponent $\Delta_x$ with the exponent $e_x$ of the floating point input operand X. The output of the adder 28 is then the exponent $e'_x$ representing the operand X in LNS format.

The other forward code converter, forward code converter 20 for operating on input operand Y, is essentially identical, and also includes an input mapping device 30 and an adder 32.

To exemplify the contents of the ROM look-up tables 26 and 30 implementing the function $\phi(m) = \log_2(m)$, the following TABLE I is provided. For purposes of example only, the following TABLE I assumes that the input mantissa m and the output exponent $\Delta_x$ are each expressed with a precision of three binary fraction bits. Thus, the actual table entries (first and third columns) are expressed in decimal for convenience, but allowable increments are ⅛ or 0.125.

TABLE I

| | $\phi(m) = \Delta = \log_2(m)$ | | |
|---|---|---|---|
| m (3 Fraction Bits) | $\phi(m)$ Decimal | $\phi(m)$ (3 Fraction Bits) | Error |
| 0.125 | −3.000000 | −3.000 | .0 |
| 0.250 | −2.000000 | −2.000 | .0 |
| 0.375 | −1.4130375 | −1.375 | .0400375 |
| 0.500 | −1.0000000 | −1.000 | .0 |
| 0.625 | −0.6780719 | −0.625 | .0530719 |
| 0.750 | −0.4150375 | −0.375 | .0400375 |
| 0.875 | −0.1926451 | −0.250 | .0573549 |

The second column of TABLE I expresses the value of the function to a precision of seven decimal fractional digits, although the exemplary table itself has only three binary fractional bits of precision. The numbers of the second column allow the error to be given in the fourth column as a matter of interest for each of the particular input values. It will be appreciated that, in practical implementations, the precision is extended to much greater than three fractional bits. Typically, eight or twelve bits of precision are used.

In the operation of the ROM look-up tables 26 and 30, the mantissa $m_x$ or $m_y$, expressed as a parallel data word having a number of bits determined by the particular implementation, is presented to the appropriate mapping device 26 or 30 as an address. This address then identifies the memory location of one of eight possible entries. The actual contents of these memory locations are as given in the third column of the above TABLE I. The appropriate contents are then read out as a multi-bit binary word. Thus, the speed of the mapping is limited only by memory access time.

The LNS arithmetic section 22 of FIG. 1 embodies principles of LNS arithmetic as previously reported in the literature. The LNS arithmetic section 22 comprises an addition path, generally designated 34, and a multiplication path, generally designated 36. It will be appreciated that the addition path 34, with appropriate sign adjustment, can also perform subtraction and that the multiplication path 36, also with appropriate sign adjustment, can perform division.

The addition path 34 and multiplication path 36 are selectively enabled by means of suitable parallel gating circuitry, represented in FIG. 1 by a 3 PDT switch comprising switch sections 38, 40 and 42.

The multiplication path 36 is trivial, and comprises simply an adder/subtractor 44 to accomplish LNS multiplication/division in accordance with Equation (3) hereinabove. Control circuitry (not shown) selects whether the adder/subtractor 44 adds to implement LNS multiplication, or subtracts to implement LNS division.

To implement Equations (4) and (5) hereinabove (and considering also the somewhat simplified notation of the Equations (6) and (7)) there are included a subtractor 46 to determine v in accordance with Equation (6), a mapping device 48 comprising a ROM to determine the function $\theta$ in accordance with Equation (7) hereinabove, and an adder 50 to determine the output $e'_s$ in LNS format in accordance with Equation (4) hereinabove.

As noted hereinabove, the order of operands must be arranged such that $e'_x \leq e'_y$, and the resultant $v \leq 0$. In the event $v<0$, then the situation can be corrected, for example, by substituting $e'_x$ for $e'_y$ in Equation (5) above, and vice versa. From the point of view of hardware, control logic (not shown in FIG. 1) causes the subtractor 46 to subtract the smaller of $e'_x$ and $e'_y$ from the larger of $e'_x$ and $e'_y$, and causes the adder 50 to add the value of $\theta(v)$ to the larger of $e'_x$ and $e'_y$.

Although the adder/subtractor 44 of the multiplication path 36 and the subtractor 46 of the addition path 34 are shown as separate units, it will be appreciated that these may actually be a single element, with the output selectively directed to the rest of the multiplication path 36 or addition path 34, as the case may be.

The following TABLE II exemplifies the contents of the ROM look-up table comprising the mapping device 48 included in the addition path 34 of the LNS arithmetic section 22.

TABLE II

| v (3 Fraction Bits) | $\theta(v) = \log_2(1 + 2^{-v})$ | | |
|---|---|---|---|
| | $\theta(v)$ Decimal | $\theta(v)$ (3 Fraction Bits) | Error |
| −1.875 | 0.3478096 | .375 | .0271904 |
| −1.750 | 0.3755144 | .375 | .0005144 |
| −1.625 | 0.4051319 | .375 | .0948681 |
| . | . | . | . |
| . | . | . | . |
| . | . | . | . |
| −0.875 | 0.627844 | 0.625 | .002844 |
| −0.750 | 0.7923523 | 0.750 | .0423523 |
| −0.625 | 0.7210839 | 0.750 | .0289161 |
| −0.500 | 0.7715535 | 0.750 | .0215535 |
| −0.375 | 0.8246497 | 0.875 | .0503503 |
| −0.250 | 0.8804081 | 0.875 | .0054081 |
| −0.125 | 0.9388534 | 0.875 | .0638533 |
| −0.000 | 1.0000000 | 1.000 | .0000000 |

As in the case of TABLE I, for purposes of example, TABLE II is expressed to three binary fraction bits of precision. Again, in actual implemenations, this precision is extended to eight or twelve bits.

The inverse code converter or output section 24 of FIG. 1 converts the LNS representation $e'_s$ of the result, whether from addition/subtraction or multiplication/division, to the output 16 in floating point format. Significantly, the floating point output 16 is inherently normalized by the inverse code converter 24, requiring no time-consuming exponent alignment.

Considering the inverse code converter 24 in detail, the exponent portion $e_s$ of the output 16 in floating point format is detemined by applying a ceiling function (upward truncation) to the representation $e'_s$ of the arithmetic result in LNS format. Thus, the inverse code converter 24 includes a ceiling function truncator 52 for implementing Equation (15) above. The ceiling function truncator 52 thus samples only those bits of the LNS arithmetic result $e'_s$ representing the integer part $e'_s$, and adds one (assuming that the fractional part is non-zero). For example, if $e'_s = 4.3125$, then $e_s = 5.0$. As another example, if $e'_s = -2.75$, then $e_s = -2.0$.

The remaining part of the inverse code converter 60 implements Equation (19). It should be noted that the implementation depicted in FIG. 1 corresponds element by element to the rigorous mathematical definition hereinabove. However, in practical implementations, a simplified form is possible, as will be seen from FIG. 2 discussed hereinbelow.

In the inverse code converter 24 of FIG. 1, a subtractor 54 implements Equation (17) hereinabove by subtracting $\lceil e'_s \rceil$ from $e'_s$ to obtain an intermediate result termed $\Delta_s$. A mapping device 56 in the form of an ROM look-up table, then implements the inverse function $\phi^{-1}(\Delta_s)$, to provide the resultant floating point mantissa $m_s$. As may be seen from Equation (18) hereinabove, the inverse function $\phi^{-1}(\Delta_s)$ is simply an exponential function.

For purposes of example, the following TABLE III depicts the contents of the ROM look-up table 56. Again, the input and output are expressed to a precision of three binary fractional bits. The numbers of the first column represent addresses applied to the ROM 56 and the numbers of the third column represent the actual contents of the addressed memory locations.

TABLE III

| $\Delta$ (3 Fraction Bits) | $\phi^{-1}(\Delta) = 2^\Delta$ | | |
|---|---|---|---|
| | $\phi^{-1}(\Delta)$ Decimal | $\phi^{-1}(\Delta)$ (3 Fraction Bits) | Error |
| −0.875 | 0.54525 | 0.500 | .04525 |
| −0.750 | 0.59460 | 0.625 | .030396 |
| −0.625 | 0.64842 | 0.625 | .023420 |
| −0.500 | 0.707107 | 0.750 | .042893 |
| −0.375 | 0.771105 | 0.750 | .021105 |
| −0.250 | 0.840896 | 0.875 | .034104 |
| −0.125 | 0.917004 | 0.875 | .042004 |
| −0.500 | 2.000000 | 1.000 | .000000 |

Figure 2:
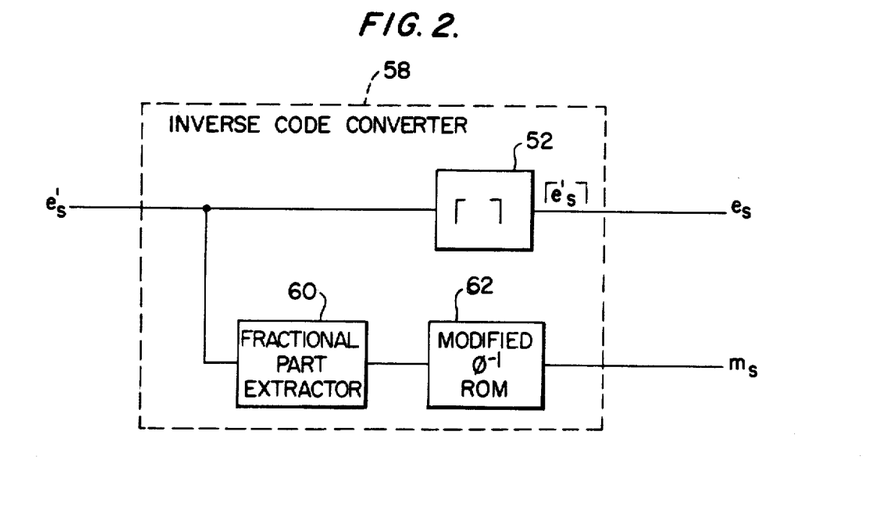
FIG. 2 is a schematic diagram of an alternative form of inverse code converter for use in the arithmetic processor of FIG. 1.

Referring briefly to FIG. 2, shown is a modified form 58 of inverse code converter which is somewhat simpler than the implementation 24 in that the need for the subtractor 54 is eliminated by providing a modified $\phi^{-1}$ function. In the inverse code converter 58 of FIG. 2, the truncator 52 is the same as in FIG. 1. However, rather than subtracting $\lceil e'_s \rceil$ from $e'_s$ to obtain a negative fractional number, a fractional part extractor 60 is included to extract those bits representing the fractional portion only of the number $e'_s$ in LNS format. Although shown as a discrete element 60 in FIG. 2, the box 60 is implemented merely by sampling the appropriate number of data lines. This fractional part is applied to a modified look-up table 62 which is substantially identical to the look-up table 56, except that the addressing is appropriately modified to reflect the lack of subtraction. Thus, and with reference to TABLE III above, the entry addressed as −0.875 in FIG. 1 ROM 56 is addressed as +0.125 in the FIG. 2 modified ROM 62. The entry addressed as −0.750 in the FIG. 1 ROM 56 is addressed in the FIG. 2 modified ROM 62 as +0.250.

FIGS. 3–6 are examples depicting the numerical values of signal flow through the FIG. 1 unit 10 of a pair of input operands. For clarity and to demonstrate the validity of the approach of the invention, the numeric examples of FIGS. 3–6 are expressed to a precision of nine decimal places.

Figure 3:
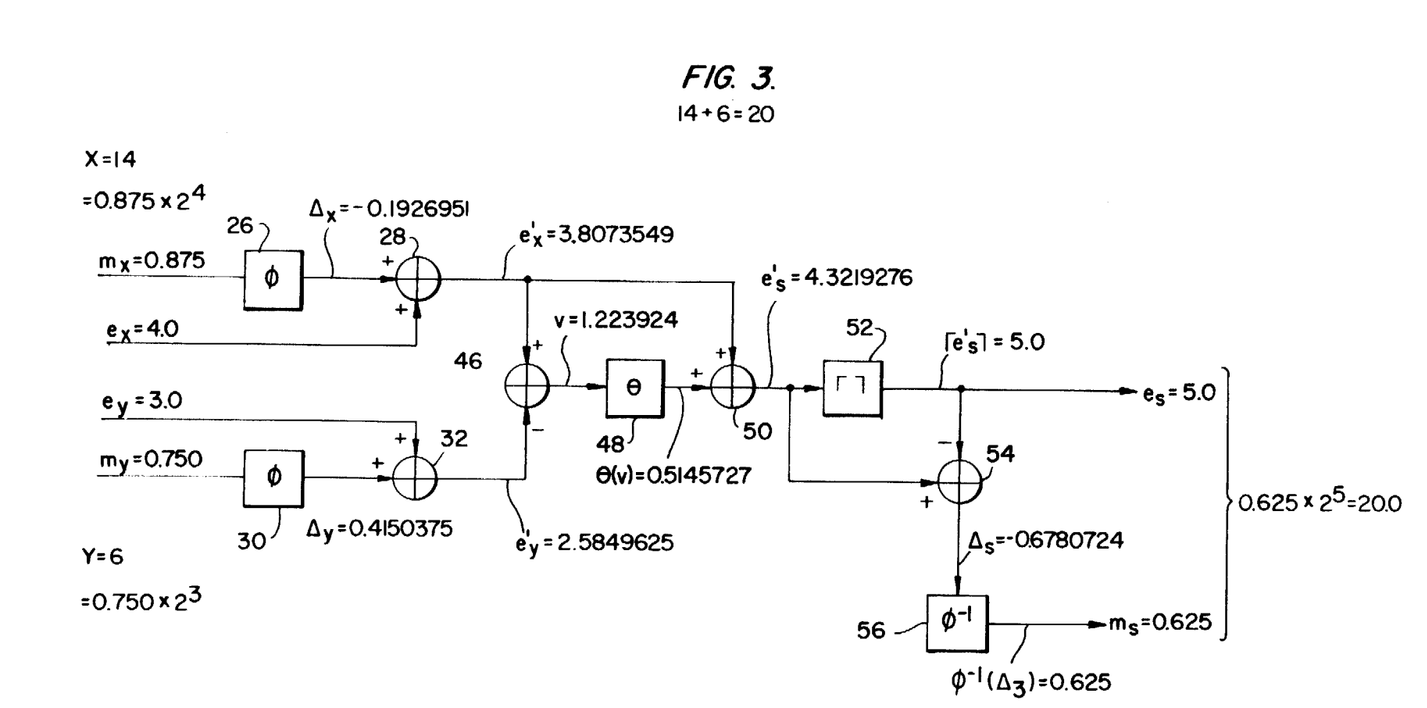
FIG. 3 is a diagram depicting signal flow through the FIG. 1 processor during an exemplary addition of two relatively large input operands.

In FIG. 3, a pair of numbers X = 14 (decimal) and Y = 6 (decimal) are added to produce the sum $X+Y=20$ (decimal). In conventional binary floating point format, $X = 14_{10} = 0.875 \times 2^4$. Similarly, $Y = 6_{10} = 0.750 \times 2^3$. The result $X+Y = 20_{10} = 0.625 \times 2^5$.

Figure 5:
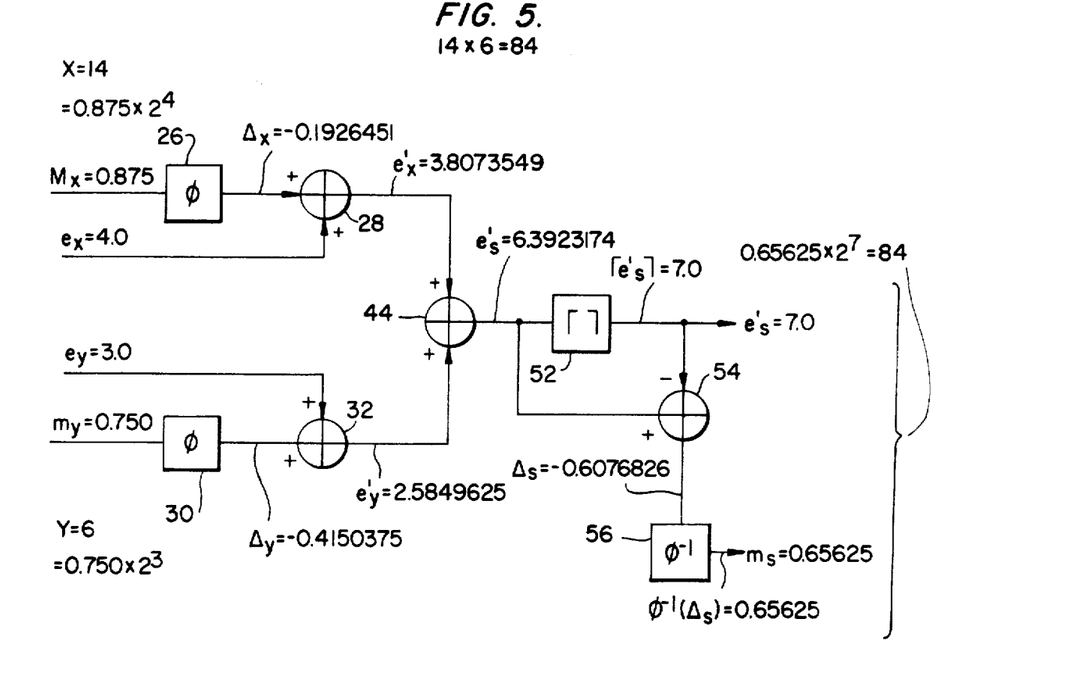
FIG. 5 is a diagram depicting signal flow through the processor of FIG. 1 during an exemplary multiplication of the same two input operands as in FIG. 3.

In FIG. 5, these same two numbers are multiplied to produce the product $84_{10} = 0.65625 \times 2^7$.

Figure 4:
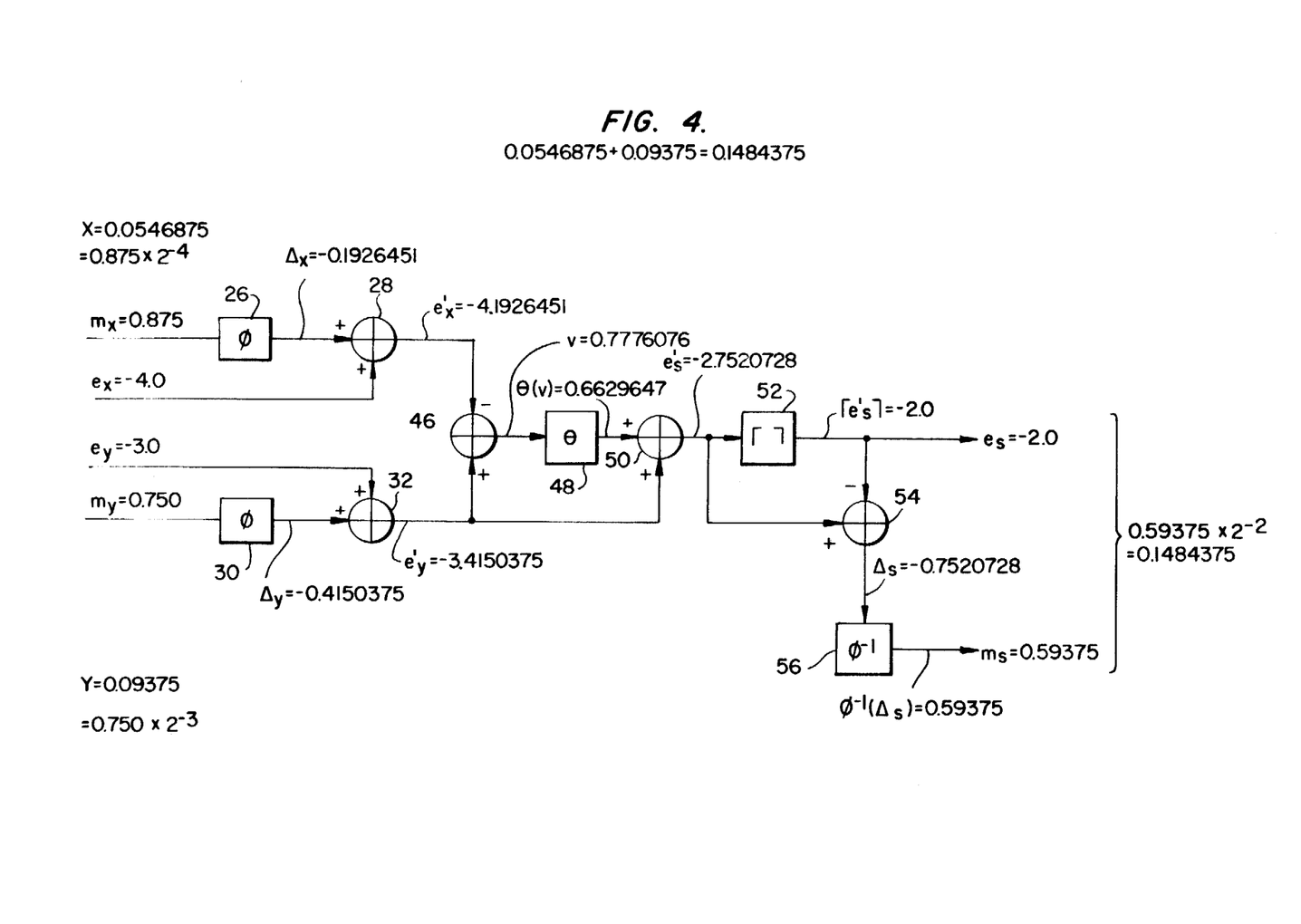
FIG. 4 is a diagram depicting signal flow through the FIG. 1 processor during an exemplary addition of two relatively small input operands.
Figure 6:
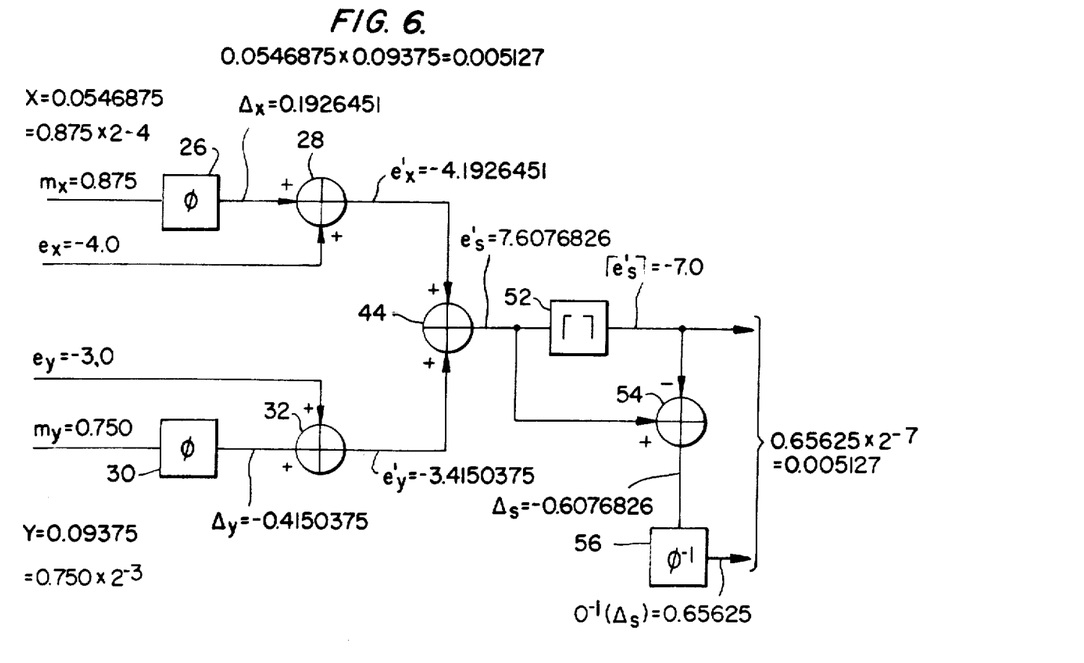
FIG. 6 is a diagram depicting signal flow through the processor of FIG. 1 during an exemplary multiplication of the same two relatively large operands as in FIG. 4.

Similarly, FIG. 4 depicts addition and FIG. 6 depicts multiplication of two relatively small numbers, $X = 0.0546875_{10} = 0.875 \times 2^{-4}$, and $Y = 0.09375_{10} = 0.750 \times 2^{-3}$. In FIG. 4, in order to maintain $v \leq 0$, $e'_x$ is subtracted from $e'_y$, and it is $e'_y$ (the larger of $e'_x$ and $e'_y$) which is added to $\theta(v)$.

Figure 7:
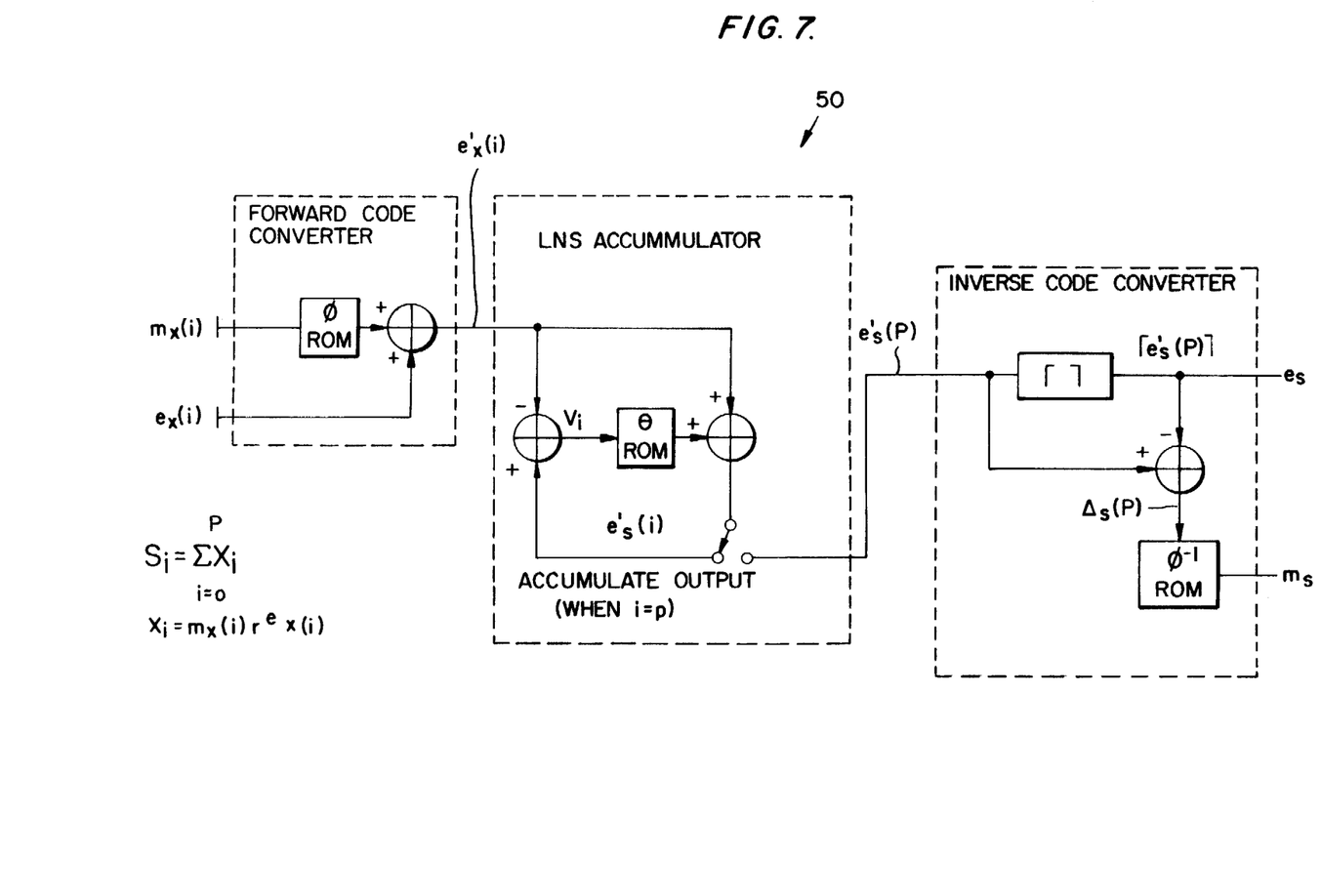
FIG. 7 is a schematic diagram of an accumulator structure.

Referring now to FIG. 7, depicted is a high-speed accumulator structure 50 for performing repeated additions without interruption. As shown in FIG. 7, each intermediate partial sum exponent of the LNS representation of the real partial sum is not converted back into floating point format. Instead, each real partial sum exponent is recirculated directly back to the LNS addition section. As a result, during accumulator operation, one conversion operation per add (i.e. the output conversion) is eliminated, resulting in even faster operation as an accumulator.

Figure 8:
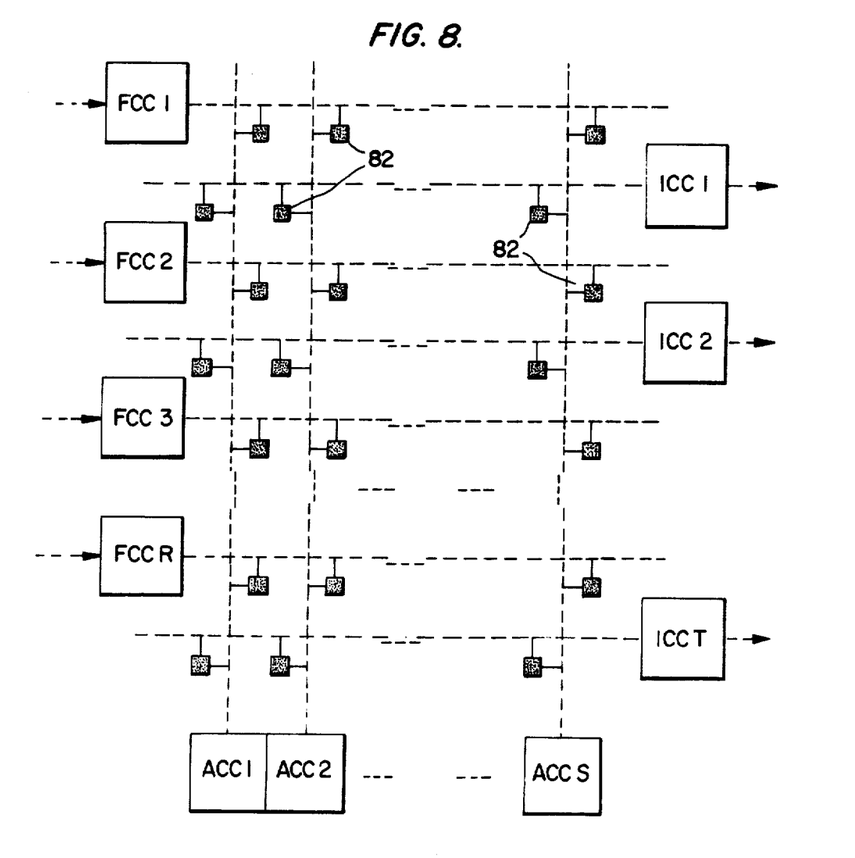
FIG. 8 is a schematic diagram of a network of floating point units combined in an ultra-fast reconfigurable numeric processor.

Finally, FIG. 8 depicts how a network of elements in accordance with the invention can be arranged as an ultrafast reconfigurable numeric processor 80. The dashed lines of FIG. 8 represent elemental building blocks selectively interconnected by multi-bit controlled switching elements 82. With appropriate control logic (not shown), different parts of the unit can be doing encoding, decoding, adds, subtracts, multiplies, divides and multiple redundancy fault testing selectively. In FIG. 8, it will be appreciated that the FCCs are forward code converters, the ICCs are inverse code converters, and the ACCs are LNS arithmetic sections.

Moreover, it will be appreciated that, unlike conventional floating point units, the arithmetic unit of the invention can more efficiently implement polynomial calculations of the form $z = \text{sum}(X^i Y^j)$ where i and j are arbitrary exponents. Typical applications are fast Fourier transforms and digital filters. The reason for this is that within the subject floating point unit, calculations are simply additive (and subtractive) exponent manipulations.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A processor for performing an arithmetic operation on a pair of input operands in floating point format each having an integer exponent part e and a mantissa part m to provide an output in floating point format having an integer exponent part $e_s$ and a mantissa part $m_s$, said processor comprising:

an input means for converting the floating point input operands to intermediate operands in logarithmic number system format, said input means including:
an input mapping device for converting the mantissa m of a floating point input operand to an exponent $\Delta$, said input mapping device satisfying the function $$\phi(m) = \Delta = \log_r(m),$$

where r is the radix, and
an adder for summing the exponent $\Delta$ with the exponent e of the floating point input operand to provide an exponent e' representing the operand in logarithmic number system format;
a logarithmic number system arithmetic means for performing an arithmetic operation on the logarithmic number system intermediate operands and providing an intermediate output in logarithmic number system format represented by an exponent $e'_s$; and
an output means for converting the logarithmic number system intermediate output to the output in floating point format.

2. A processor in accordance with claim 1, wherein said output section comprises:
a ceiling function truncator for determining, from the exponent $e'_s$ representing the intermediate output in logarithmic number system format, an integer value $\lceil e'_s \rceil$, the integer value $\lceil e'_s \rceil$ being exponent part $e_s$ of the floating point output; and
an output mapping device for determining the mantissa port $m_s$ of the floating point output, said output mapping device satisfying the function $$m_s = \phi^{-1}(e'_s - \lceil e'_s \rceil) = r^{(e'_s - \lceil e'_s \rceil)}$$

where r is the radix.

3. A processor for performing an arithmetic operation on a pair of input operands in floating point format to provide an output in floating point format having an integer exponent part $e_s$ and a mantissa part $m_s$, said processor comprising:
an input means for converting the floating point input operands to intermediate operands in logarithmic number system format;
a logarithmic number system arithmetic means for performing an arithmetic operation on the logarithmic number system intermediate operands and providing an intermediate output in logarithmic number system format represented by an exponent $e'_s$; and
an output means for converting the logarithmic number system intermediate output in floating point format, said output means including
a ceiling function truncator for determining, from the exponent $e'_s$ representing the intermediate output in logarithmic number system format, an integer value $\lceil e'_s \rceil$, the integer value $\lceil e'_s \rceil$ being the exponent part $e_s$ of the floating point output, and
an output mapping device for determining the mantissa part $m_s$ of the floating point output, said output mapping device satisfying the function $$m_s = \phi^{-1}(e'_s - \lceil e'_s \rceil) = r^{(e'_s - \lceil e'_s \rceil)}$$

where r is the radix.

4. An accumulator for summing a series of input operands in floating point format each having an integer exponent $e_x$ and a mantissa part $m_x$ to provide an output in floating point format having an integer exponent part $e_s$ and a mantissa part $m_s$, said accumulator comprising:
an input means for converting the floating point input operands to a series of intermediate operands in logarithmic number system format, said input means including:
an input mapping device for converting the mantissa $m_x$ of a floating point input operand to an exponent $\Delta$, said input mapping device satisfying the function $$\phi(m) = \Delta = \log_r(m),$$

where m is the mantissa $m_x$ of the floating point input operand, and r is the radix, and
an adder for summing the exponent $\Delta$ with the exponent $e_x$ of the floating point input operand to provide an exponent e′ representing the operand in logarithmic number system format;

a logarithmic number system accumulator for successively adding the intermediate operands to accumulate a sum in logarithmic number system format represented by an exponent $e'_s$; and an output means for converting the logarithmic number system sum to the output in floating point format.

5. An accumulator in accordance with claim 4, wherein said output means comprises:

a ceiling function truncator for determining, from the exponent $e'_s$ representing the sum in logarithmic number system format, an integer value $\lceil e'_s \rceil$, the integer value $\lceil e'_s \rceil$ being the exponent $e_s$ of the floating point output; and an output mapping device for determining the mantissa $m_s$ of the floating point output, said output mapping device satisfying the function $$m_s = \phi^{-1}(e'_s - \lceil e'_s \rceil) = r^{(e'_s - \lceil e'_s \rceil)}$$

where r is the radix.

6. An accumulator for summing a series of input operands in floating point format to provide an output in floating point format having an integer exponent part $e_s$ and a mantissa part $m_s$, said accumulator comprising:

an input means for converting the floating point input operands to a series of intermediate operands in logarithmic number system format;

a logarithmic number system accumulator for successively adding the intermediate operands to accumulate a sum in logarithmic number system format represented by an exponent $e'_s$; and an output means for converting the logarithmic number sum to the output in floating point format, said output means including:

a ceiling function truncator for determining, from the exponent $e'_s$ representing the sum in logarithmic number system format, an integer value $\lceil e'_s \rceil$, the integer vale $\lceil e'_s \rceil$ being the exponent part $e_s$ of the floating point output, and an output mapping device for determining the mantissa part $m_s$ of the floating point output, said output mapping device satisfying the function $$m_s = \phi^{-1}(e'_s - \lceil e'_s \rceil) = r^{(e'_s - \lceil e'_s \rceil)}$$

wherein r is the radix.

7. A converter for converting a number expressed in floating point format to logarithmic number system format, said converter comprising:

an input mapping device for converting a mantissa m of a floating point input operand to an exponent $\Delta$, said input mapping device satisfying the function $$\phi(m) = \Delta = \log_r(m),$$

where m is the mantissa of the floating point input operand, and r is the radix; and an adder for summing the exponent $\Delta$ with an exponent e of the floating point input operand to provide an exponent e′ representing an operand in the logarithmic number system format.

8. A converter for converting a number expressed in logarithmic number system format to normalized floating point format, said converter comprising:

a ceiling function truncator for determining, from an exponent $e'_s$ representing an intermediate output in the logarithmic number system format, an integer value $\lceil e'_s \rceil$, the integer value $\lceil e'_s \rceil$ the exponent $e_s$ of the floating point output; and an output mapping device for determining the mantissa $m_s$ of the floating point output, said output mapping device satisfying the function $$m_s = \phi^{-1}(e'_s - \lceil e'_s \rceil) = r^{(e'_s - \lceil e'_s \rceil)}$$

where r is the radix.

* * * * *

UNITED STATES PATENT AND TRADEMARK OFFICE
CERTIFICATE OF CORRECTION

PATENT NO.  :   4,720,809
DATED       :   January 19, 1988
INVENTOR(S) :   Fred J. Taylor It is certified that error appears in the above-identified patent and that said Letters Patent is hereby corrected as shown below:

Claim 3, column 12, line 40, "partr" should read --part--;

Claim 5, column 13, line 13, "inlogarithmic" should read --in logarithmic--;

Claim 6, column 14, line 4, "ms" should read --$m_s$--

Claim 8, column 14, lines 32 and 33 should read
--value $[e'_s]$, the integer value $[e'_s]$ being the exponent $e_s$ of the floating point output; and--

Signed and Sealed this

Seventh Day of June, 1988

*Attest:*

DONALD J. QUIGG

*Attesting Officer*   *Commissioner of Patents and Trademarks*